US012462807B2

(12) United States Patent
Hariharan et al.

(10) Patent No.: US 12,462,807 B2
(45) Date of Patent: Nov. 4, 2025

(54) SYSTEM AND METHOD FOR ADAPTING LEGACY SERVERS TO OPERATE WITHIN RASA NLU FRAMEWORK

(71) Applicant: Quantiphi, Inc., Marlborough, MA (US)

(72) Inventors: Reghupathi Hariharan, Marlborough, MA (US); Sijil S, Mumbai (IN)

(*) Notice: Subject to any disclaimer, the term of this patent is extended or adjusted under 35 U.S.C. 154(b) by 200 days.

(21) Appl. No.: 18/490,033

(22) Filed: Oct. 19, 2023

(65) Prior Publication Data

US 2025/0131926 A1     Apr. 24, 2025

(51) Int. Cl.
*G10L 15/30*    (2013.01)
*G06F 9/54*     (2006.01)
*G10L 15/18*    (2013.01)
*G10L 15/22*    (2006.01)

(52) U.S. Cl.
CPC ............ *G10L 15/30* (2013.01); *G06F 9/543* (2013.01); *G10L 15/1815* (2013.01); *G10L 15/22* (2013.01); *G10L 2015/223* (2013.01)

(58) Field of Classification Search
USPC .................................................. 704/1–504
See application file for complete search history.

(56) References Cited

U.S. PATENT DOCUMENTS

| 2020/0202847 | A1* | 6/2020 | Mukherjee | ........... G10L 15/1822 |
| 2022/0075960 | A1* | 3/2022 | Brown | ..................... G06F 40/40 |
| 2022/0229994 | A1* | 7/2022 | Sharma | .................... H04L 51/18 |
| 2025/0131926 | A1* | 4/2025 | Hariharan | ............... G06F 9/543 |

* cited by examiner

*Primary Examiner* — Marcus T Riley
(74) *Attorney, Agent, or Firm* — RC Trademark Company (57) ABSTRACT

The present disclosure provides a system for adapting legacy servers to operate within a Rasa NLU framework. The system includes a first server configured to store domain-specific functions configured to perform tangible domain-specific operations, a Rasa NLU server configured to receive a user request and a processor configured to execute an API call to an API handler based on the user request using a webhook configuration and execute domain-specific functions in the first server by executing the API handler by matching a conditional statement defined in the API handler specific to the user intent to be executed. Further, the processor is configured to cause the first server to perform tangible domain-specific operations based on the executed one or more domain-specific functions. The system avoids use of external libraries like the Rasa SDK while adapting or integrating the existing legacy server with the Rasa NLU server.

10 Claims, 3 Drawing Sheets

SYSTEM AND METHOD FOR ADAPTING LEGACY SERVERS TO OPERATE WITHIN RASA NLU FRAMEWORK

FIELD OF TECHNOLOGY

The present disclosure generally relates to conversational artificial intelligence, AI, servers. Specifically, the present disclosure relates to a system and a method for adapting legacy servers to operate within a Rasa natural language understanding, NLU, framework.

BACKGROUND

In today's digital age, industries are increasingly turning to conversational AI systems, such as chatbot services, to be made available on websites to enhance customer interactions, streamline processes, and provide round-the-clock support. Conventionally, such chatbot services can be made on any proprietary frameworks, such as Alexa, Dialogflow, etc. Further, to avoid dependency on such proprietary services, open-source frameworks like Rasa natural language understanding, NLU, are currently used to deploy chatbot services, which provides enhanced privacy and plays a crucial role in domains like medical, banks, insurance firms and the like. In order to implement the Rasa NLU framework in the existing legacy servers, a Rasa NLU software package is needed to be integrated into the existing legacy servers.

Currently, to adapt or integrate any existing legacy server with the Rasa NLU server, there is requirement for integrating a Rasa software development toolkit, SDK in the existing legacy server. Further, in order to integrate the Rasa SDK, there is a requirement to modify the entire codebase of the existing legacy servers and do reworks such as testing or debugging etc. on the modified codebase. Currently, such approach may only work in case any industry-related server is built from scratch. However, such conventional integration approach requires extensive rework while adapting an already existing legacy server with the Rasa NLU server, which is a time-consuming and a technically challenging process. Further, such challenge becomes particularly cumbersome when dealing with large legacy servers, such as those used in banking or insurance industries, and the like. Thus, there exists a technical problem of how to avoid use of the Rasa SDK external library while adapting the existing legacy server to operate within the Rasa NLU framework.

Further limitations and disadvantages of conventional approaches will become apparent to one of skill in the art through comparison of such systems with some aspects of the present disclosure, as set forth in the remainder of the present application with reference to the drawings.

BRIEF SUMMARY OF THE DISCLOSURE

The present disclosure provides for a system and a method for adapting legacy servers to operate within a Rasa NLU framework. The present disclosure seeks to provide a solution to the existing problem of how to avoid use of the Rasa SDK external library while adapting or integrating the existing legacy server with the Rasa NLU server. An aim of the present disclosure is to provide a solution that overcomes at least partially the problems encountered in the prior art and provide an improved system and method for adapting legacy servers to operate within a Rasa NLU framework, which eliminates the implementation of the Rasa SDK in the existing legacy server while integrating with the Rasa NLU server.

In one aspect, the present disclosure provides a system for adapting legacy servers to operate within a Rasa natural language understanding, NLU, framework. The system comprises a first server configured to store a plurality of predefined domain-specific functions, each function is configured to perform a tangible domain-specific operation and a Rasa natural language understanding, NLU, server configured to receive a user request via a user interface. Further, the system includes a processor communicatively coupled to the first server and the Rasa NLU server. Moreover, the processor is configured to execute an application programming interface (API) call to an API handler defined in the first server based on the user request, wherein the API call is executed using a webhook configuration defined in the Rasa NLU server. In addition, the processor is configured to identify and execute one or more domain-specific functions of the plurality of predefined domain-specific functions in the first server by executing the API handler. The one or more domain-specific functions are executed by matching a conditional statement defined in the API handler corresponding to the user request to be executed. Furthermore, the processor is configured to automatically cause the first server to perform one or more tangible domain-specific operations based on the identified and executed one or more domain-specific functions, in response to the user request.

The system is configured to seamlessly adapt the first server (i.e., the legacy server) to operate with the Rasa NLU server by conditionally triggering the domain-specific functions in the first server through the API handler, while still avoiding use of the Rasa SDK external library while adapting the existing legacy server to work and operate with the Rasa NLU server. The system employs conditional statements within the API handler to execute the appropriate domain-specific functions based on the user's request. This eliminates the need for server-developers to perform extensive modifications in the existing codebase of the first server. The API handler implemented in the system enables the Rasa NLU server to access the domain-specific functions in the first server as an API call through the webhook configuration, which causes smooth integration of the first server and the Rasa NLU server without the need for complex custom coding or dependencies.

Advantageously, by employing the Rasa NLU server in tandem with API handler and conditional statements, the system is able to automatically recognize, interpret, and respond to user requests in a meaningful way. When a user submits a request via the interface, the system deciphers the request using Rasa NLU, triggers the appropriate API call through a webhook configuration, identifies the relevant domain-specific function based on conditional statements, and subsequently executes the tangible domain-specific operation. This leads to a more dynamic and context-aware response mechanism, enhancing user experience and system efficiency. Furthermore, the system enables the integration of existing or legacy servers, which might have been designed before modern natural language processing (NLP) tools like Rasa became available, into the Rasa framework. This not only extends the life and relevance of these legacy servers but also allows organizations to leverage the capabilities of modern NLP and AI-based chatbot services without having to entirely redevelop or replace their existing infrastructure. As a result, there is a seamless melding of old and new technologies, allowing users to access domain-specific functionalities via natural language requests. These technical effects highlight the system's ability to bridge the gap between older, domain-specific functionalities and modern natural language understanding frameworks, enabling automated, intuitive interactions for end-users.

In another aspect, the present disclosure provides a method for adapting legacy servers to operate within a Rasa natural language understanding, NLU, framework. The method comprises receiving a user request via a user interface communicatively coupled to the Rasa NLU server and executing, by the processor, an application programming interface (API) call to an API handler defined in a first server based on the user request. Moreover, the API call is executed through a webhook configuration defined in the Rasa NLU server. Further, the method comprises identifying and executing, by the processor, one or more domain-specific functions of the plurality of predefined domain-specific functions in the first server by executing the API handler. Moreover, the one or more domain-specific functions are executed by matching a conditional statement defined in the API handler specific to the user request to be executed. Further, the method comprises automatically causing, by the processor, the first server to perform one or more tangible domain-specific operations based on the identified and executed one or more domain-specific functions, in response to the user request.

The method achieves all the advantages and technical effects of the system of the present disclosure.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not too scaled. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF THE DISCLOSURE

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
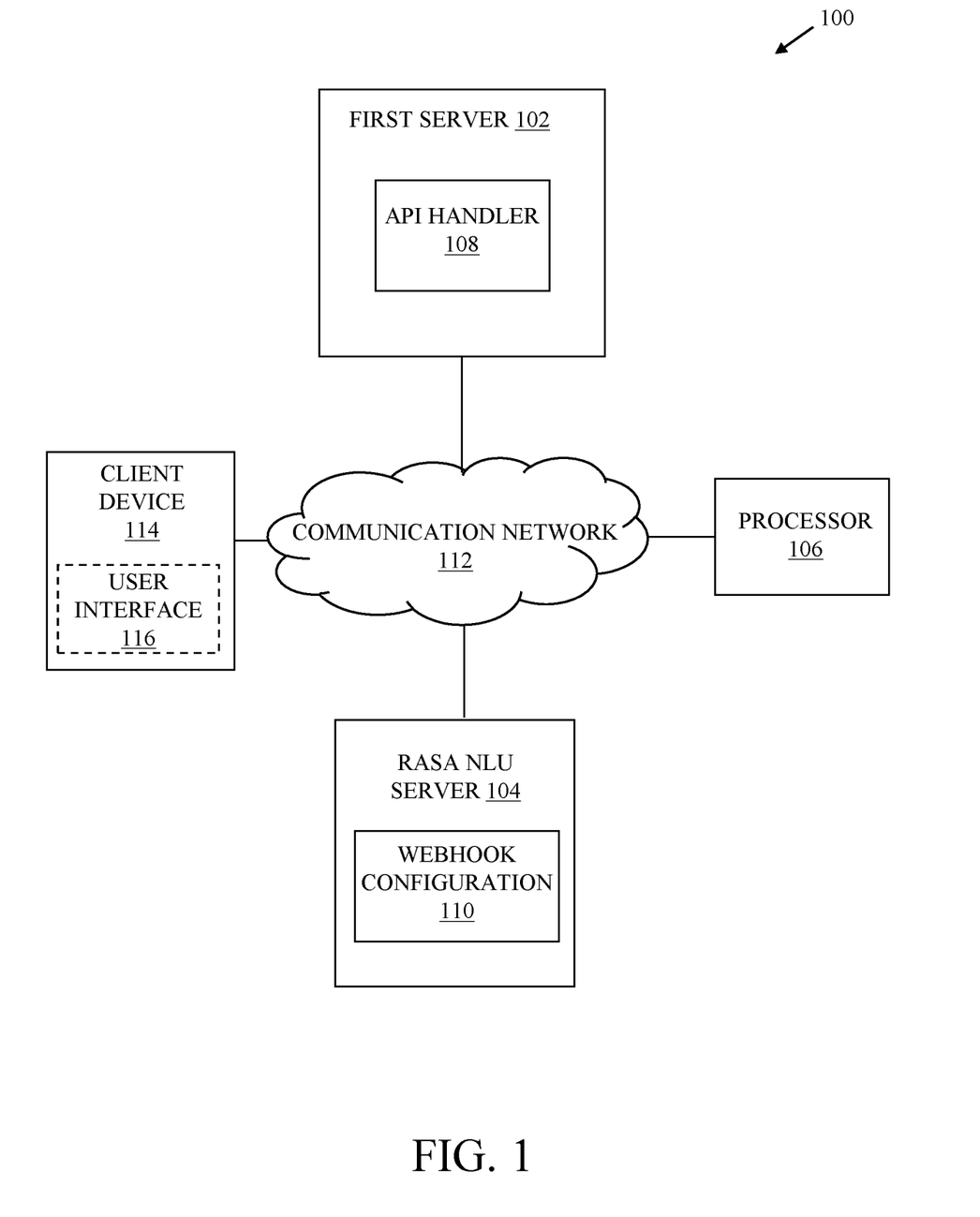
FIG. 1 is a network diagram illustrating a system for adapting legacy servers to operate within a Rasa NLU framework, in accordance with an embodiment of the present disclosure.

FIG. 1 is a network diagram illustrating a system for adapting legacy servers to operate within a Rasa NLU framework, in accordance with an embodiment of the present disclosure. With reference to FIG. 1, there is shown a system 100 for adapting legacy servers to operate within the Rasa NLU framework. The system 100 includes a first server 102, a Rasa natural language understanding, NLU, server 104 and a processor 106 communicatively coupled to the first server 102 and the Rasa NLU server 104. The first server 102 further includes an API handler 108 and the Rasa NLU server 104 includes a webhook configuration 110.

The system 100 for adapting legacy servers to operate within the Rasa NLU framework refers to integration of older or traditional servers (referred to as "legacy" servers) to function harmoniously within the modern Rasa NLU framework, which is geared towards natural language understanding (NLU). The adaptation performed by the system 100 is independent of installation of Rasa SDK kit in the legacy servers. Such adaptation allows for the legacy server's predefined, domain-specific functionalities to be accessible and operable within the context of the Rasa environment with improved latency and seamless functioning.

The first server 102 refers to a hardware computing system, which is configured to manage and perform operations involved in an industry. In an implementation, the first server 102 is a specialized server, which handles multiple functionalities involved in day-to-day operations of the industry. In an example, the first server 102 is configured to perform operations in industries which may include, but not limited to, manufacturing, medical, banking, robotics, insurance, and the like. The first server 102 is utilized to address the technology and data processing needs of a specific industry. In an example, the first server 102 is an application server. The first server 102 is configured to store a plurality of predefined domain-specific functions. Furthermore, each function is configured to perform one or more tangible domain-specific operations.

The domain-specific functions refer to specific tasks that the first server 102 is designed to perform within a particular industry or domain. The tangible domain-specific operations refer to real-world actions or procedures that have both specific applicability to a particular field or industry and produce concrete, observable outcomes. In other words, the tangible domain-specific operations are indicative of high-level indications associated with one or more specialized tasks involved in the industry and the tangible-domain-specific operations refer to detailed steps taken by the first server 102 to achieve tangible output of the domain-specific functions. In an implementation, the first server 102 may be a business legacy server. The word "legacy" indicates that the first server 102 is configured to perform domain-specific functions from a considerable time period and includes data from long time. In such implementation, the first server 102 is based on an extensive codebase, where the codebase is developed over time to enable the first server 102 to perform the domain-specific functions.

The system 100 further includes the Rasa natural language understanding, NLU, server 104 configured to receive a user request via a user interface 116. The Rasa NLU server 104 is a machine learning framework, which is configured to create artificial intelligence, AI, assistants or chatbots. The Rasa NLU server 104 is responsible for handling various tasks related to chatbot interactions, including the natural language understanding (NLU) and dialogue management based on user queries. The user request refers to an input communication provided by a user via a user interface 116 operating with the Rasa NLU server 104. For example, the Rasa NLU server 104 may be associated with an application server (as the first server 102) having capability to retrieve data related to medical records of patients previously admitted in a hospital. In such case, the user may request information from the application server such as "Can you provide me medical records of patient X." as the user request. In an implementation, the user interface 116 is associated with a chatbot. The user request is received through a client device 114 having the user interface 116, which is communicatively coupled to the Rasa NLU server 104. In an implementation, the client device 114 is a computer which is remotely connected with the Rasa NLU server 104 and the user is entering the user request through the user interface 116 of the client device 114. The client device 114 refers to an electronic computing device operated by the user. The client device 114 may be configured to obtain the user request through the user interface 116 and communicate the user request to the Rasa NLU server 104. Examples of the client device 114 may include but are not limited to a mobile device, a smartphone, a desktop computer, a laptop computer, a Chromebook, a tablet computer, a robotic device, or other user devices.

In an implementation, the user request is transmitted from the client device 114 to the Rasa NLU server 104 in the form of a text typed within the chatbot. In accordance with an embodiment, the user request is received via the user interface 116 coupled to the Rasa NLU server 104 in a human language through a voice command or text command. With reference to previous example, the user request "Can you provide me medical records of patient X." is a text command. In another example, the user may be accessing the Rasa NLU server 104 through a mobile phone as the client device 114, the user request may be in the form of a voice input provided by the user to the mobile phone. In such example, a processing unit is connected to the client device 114 and the Rasa NLU server 104 and the processing unit is configured to convert the voice input provided by the user into a format understandable by the Rasa NLU server 104.

The processor 106 refers to a computational element, which is configured to execute the domain-specific functions in the first server 102 based on the user request. The processor 106 may refer to one or more individual processors, processing devices, and various elements associated with a processing device that may be shared by other processing devices. Additionally, the one or more individual processors, processing devices, and elements are arranged in various architectures for responding to and processing the instructions that drive the system 100. Examples of the processor 106 may include but are not limited to, a hardware processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and other processors or control circuitry.

The communication network 112 includes a medium (e.g., a communication channel) through which the processor 106 communicates with the first server 102 and the Rasa NLU server 104. The communication network 112 may be a wired or wireless communication network. Examples of the communication network 112 may include, but are not limited to, Internet, a Local Area Network (LAN), a wireless personal area network (WPAN), a Wireless Local Area Network (WLAN), a wireless wide area network (WWAN), a cloud network, a Long-Term Evolution (LTE) network, a Metropolitan Area Network (MAN), and/or the Internet.

In operation, when the user enters the user request through the user interface 116, the user request is transmitted to the Rasa NLU server 104 through the communication network 112. In accordance with an embodiment, the Rasa NLU server 104 is configured to identify a user intent from the user request. The user intent refers to a specific intention or purpose behind the user request. In an implementation, the Rasa NLU server 104 is configured to identify the user intent from the user request through the method of natural language understanding (NLU). Further, in an implementation, the processor 106 is configured to extract an action name through the Rasa NLU server 104 based on the user intent. In an implementation, the action name refers to an identifier or a keyword, which relates to one or a combination of domain-specific functions from the plurality of domain-specific functions defined in the first server 102. The processor 106 is configured to execute a predefined action in the Rasa NLU server 104 in relation to the user intent identified by the Rasa NLU server 104. For example, the user request may be "Hi, I am Mr. X, I want to check my account balance". Based on such user request, the Rasa NLU server 104 may be configured to implement the NLU methodology to decompose the user request into parts as "Hi", "I am Mr. X", "I want to check my account balance". Further the Rasa NLU server 104 is configured to identify user intents of each decomposed part, as "Hi" is an intent for greet, "Mr. X" is name of a person and "check my account balance" is an intent to check the balance of the bank account of Mr. X. Here, the user intent is to check the balance of the bank account of Mr. X. Based on such user intent, the processor 106 is configured to match the user intent with the predefined action names in the Rasa NLU server 104 to determine the action name. For example, for the user intent to check the balance of the bank account of Mr. X, the predefined action name is "check_balance". Here, the processor 106 is configured to extract the action name as "check_balance".

After extracting the action name, the processor 106 is further configured to execute an application programming interface (API) call to an API handler 108 defined in the first server 102 based on the user request. The API call refers to a request or a message transmitted by the processor 106 to the first server 102 to execute one or more domain-specific functions of the plurality of predefined domain-specific functions. Moreover, the API call is executed using the webhook configuration 110 defined in the Rasa NLU server 104. The webhook configuration 110 refers to a user-defined endpoint that allows the Rasa NLU server to transmit real-time data to the first server in order to execute the domain-specific functions. The webhook configuration 110 is specifically defined within the Rasa NLU server 104 by the processor 106 to establish real-time communication between the Rasa NLU server 104 and the first server 102. In an implementation, the API call based on the webhook configuration 110 includes a request body. The request body refers to a set of details required for executing the one or more domain-specific functions in the first server 102. The request body includes the action name along with one or more request parameters. In an example, the one or more request parameters include details of the user entering the user request through the user interface 116. In continuation with the previous example, the details of the user such as the name of the user, address, identification number and the like are included in the request parameters. In an implementation, the request parameters are obtained by the Rasa NLU server 104 through an exchange of a set of query-response pairs between the Rasa NLU server 104 and the user interface 116. For example, if the user enters the user request as "Hi, I want to open a bank account", then the Rasa NLU server 104 is configured to identify user intent as creating bank account. Based on the user intent, the Rasa NLU server 104 is configured to provide a response to ask the user to provide user details. After receiving the user details from the user through the user interface 116, the Rasa NLU server 104 is further configured to store the user details received from the user to pass to the API call for executing the domain-specific action of opening bank account. The request parameters are extracted by the Rasa NLU server 104 through the user request. For example, the user request is "who is the 35$^{th}$ president of America". For such user request, the user intent is getting name of president, the action name is "get_president" and the request parameters are "president number" and "country". The Rasa NLU server 104 is configured to store the request parameters. In accordance with an embodiment, the processor 106 is configured to transmit the action name from the Rasa NLU server 104 to the API handler 108 for executing the one or more domain-specific functions. The action name is transferred to the API handler 108 using the webhook configuration 110 along with the request body.

After extracting the request body and the action name, the processor 106 is configured to generate the API call along with the request body and the action name to the API handler 108 by using the webhook configuration 110. In accordance with an embodiment, the webhook configuration 110 is a uniform resource locator, URL. Moreover, the URL is indicative of a path to the API handler 108 for executing the one or more domain-specific functions. In other words, the webhook configuration 110 is an address for the API handler 108 based on which the processor 106 is configured to execute the API handler 108. The URL provides an address to the API handler 108 to which the API call is to be transferred based on the user intent.

After receiving the API call, the processor 106 is configured to identify and execute one or more domain-specific functions of the plurality of predefined domain-specific functions in the first server 102 by executing the API handler 108. Moreover, the one or more domain-specific functions are executed by matching a conditional statement defined in the API handler 108 specific to the action name received by the API handler 108. In an implementation, the API handler 108 is a body of conditional statements defined in the first server 102. The conditional statement for each action name is predefined in the API handler 108 of the first server 102 and the processor 106 is configured to match the conditional statement based on the action name passed along with the API call.

The processor 106 is configured to identify the one or more domain-specific functions by matching the action name with the conditional statements in the API handler 108 defined in the first server 102. For example, for the user request "I want to open bank account", the processor 106 may be configured to match the action name with the conditional statements in the API handler 108. Further, the processor 106 may be configured to execute the domain-specific function "open_account" by executing the conditional statement associated with the domain-specific function "open_account". In accordance with an embodiment, the conditional statement is a switch-case statement or an if-else statement indicative of the existing one or more predefined domain-specific functions in the first server 102. The switch-case statement refers to a programming construct that tests the value of an expression or variable against multiple possible values (case labels) and, upon finding a match, executes a specific block of code associated with the matched value. The if-else statement refers to a programming structure that evaluates a given condition or expression based on whether the condition is true or not. In the API handler 108, the switch-case statement or if-else statement evaluate multiple conditions associated with the one or more domain-specific functions defined in the first server 102 and execute the action corresponding to the combination of one or more domain-specific functions, which gets matched with the action name received in the API call. By allowing different types of conditional statements (switch-case, if-else, or design patterns), the system 100 can accommodate various coding styles and preferences while adapting with the first server 102 as well as allow developers with different coding backgrounds and expertise can work on the system 100 without need of external libraries like the Rasa SDK. In an implementation, the API handler 108 includes a design pattern indicative of the existing one or more predefined actions in the first server 102. In such implementation, the design pattern involves creating an interface and the interface is implemented for reusing the multiple domain-specific functions.

After executing the one or more domain-specific functions, the processor 106 is configured to automatically cause the first server 102 to perform one or more tangible domain-specific operations based on the identified and executed one or more domain-specific functions, in response to the user request. In an implementation, the one or more tangible functions are included in the body of conditional statements in the API handler 108. For example, in case the user intent is to create a bank account, the one or more tangible domain-specific operations include identity verification, document submission, filling application forms and the like. Such tangible domain-specific operations are predefined in the API handler 108 for a definite domain-specific function. After performing the one or more tangible domain-specific operations, the processor 106 is configured to generate a response to notify the Rasa NLU server 104 after completion of the tangible domain-specific operations. In accordance with an embodiment, the processor 106 is configured to provide response related to the executed one or more domain-specific functions in system understandable language to the Rasa NLU server 104 and further, the Rasa NLU server 104 is configured to provide response in the human language through the user interface 116 as a voice or text response. For example, in case the domain-specific function related to opening a bank account is executed, the processor 106 may be configured to provide response in system understandable language to the Rasa NLU server 104, which in turn would return a response like "account is successfully created" to the user in the form of text through the user interface 116.

In another exemplary scenario, the first server 102 may be an application server of a hospital, interfaced with a database which is having medical information of patients previously as well as currently admitted in the hospital. For the first server 102, the user request is "I am Mr. X, can you show my medical records?". Further, the Rasa NLU server 104 may be configured to identify the user intent as "request to display of medical records of Mr. X". After identifying the user intent, the processor 106 is configured to extract the action name and request parameters from the user request. In such example, the action name may be "show_medical_records" and the request parameters are "user_name" and "user_credentials". The request parameter "user_name" is extracted by the Rasa NLU server 104 from the user request and the request parameter "user_credentials" is received from the user through the set of query-response pairs by the Rasa NLU server 104. Further, the processor 106 is configured to generate an API call to the API handler 108 in the first server 102. The exemplary structure of the API call may be given as follows:

```
http://localhost:8000/handler/
{
action_name : show_medical_records
request_params : [user_name, user_credentials]
}
```

After transmitting the API call to the API handler 108, the processor 106 may be configured to execute the API handler 108. While executing the API handler 108, the processor 106 may be configured to call the predefined domain-specific functions in the first server 102 through the API handler 108 by executing the conditional statement related to the corresponding domain-specific functions.

An exemplary structure of the API handler 108 may be as follows:

```
if {action name == show_medical_records}
    if check_authorization (user_credentials):
        patient_info = retrieve_patient_information (user_name)
        if patient_info:
            medical_records = access_medical_records (patient_info)
        return medical_records
```

In such example, "retrieve patient information (user_name)", "access_medical_records (patient_info)" and "display_medical_records (medical_records)" may be the predefined domain-specific functions in the first server 102 which are triggered by the action name "show_medical_records". The processor 106 is configured to execute the API handler 108 to perform the tangible domain-specific operations of retrieving patient information, accessing medical records and returning the medical records based on the patient information by executing each domain-specific function.

In an implementation, the action name in the request body corresponds to a definite action to be executed by the first server 102 to fulfill the user request. For each action, multiple domain-specific functions are predefined in the first server 102. Further, each domain-specific function includes one or more tangible domain-specific operations. For example, the user request may be "Audit all of my accounts". Further, the Rasa NLU server 104 identifies the user intent as auditing all bank accounts of the user, irrespective of type of account (such as fixed deposit, recurring deposit, and the like) and matches the user intent with the predefined action names in the Rasa NLU server 104 to determine the action name, such as action 1. The API handler 108 of the first server 102 may include conditional statements associated with multiple predefined actions, such as action 1, action 2 and the like with corresponding multiple domain-specific functions, such as function 1, function 2, and the like, as follows:

```
case (action 1)
    domain-specific function 1
        domain-specific operation 1
        domain-specific operation 2
    domain-specific function 2
        domain-specific operation 3
        domain-specific operation 4
```

In continuation with the example, the action 1 may correspond to auditing all bank accounts, whereas the domain-specific function 1 may correspond to auditing the fixed deposit account, the domain-specific function 2 may correspond to auditing recurring deposit account. Further, the domain-specific operations 1 and 2 may correspond to tangible steps needed to be performed by the first server 102 to audit the fixed deposit account and the domain-specific operations 3 and 4 may correspond to tangible steps needed to be performed by the first server 102 to audit the recurring deposit account. For executing action 1, multiple domain-specific functions are to be executed by the first server 102.

The system 100 is configured to seamlessly adapt the first server 102 (i.e., the legacy server) to operate with the Rasa NLU server 104 by conditionally triggering the domain-specific functions in the first server 102 through the API handler 108, while still avoiding use of the external libraries like the Rasa SDK while adapting the existing legacy server to work and operate with the Rasa NLU server 104. The system 100 generates and employs conditional statements within the API handler 108 to execute the appropriate domain-specific function based on the user's request. This eliminates the need for server-developers to perform extensive modifications in the existing codebase of the first server 102. The API handler 108 created in the system 100 enables the Rasa NLU server 104 to access the domain-specific functions in the first server 102 as an API call through the webhook configuration 110, which causes smooth integration of the first server 102 and the Rasa NLU server 104 without the need for complex custom coding or dependencies.

Advantageously, by employing the Rasa NLU server 104 in tandem with API handler 108 and conditional statements, the system 100 is able to automatically recognize, interpret, and respond to user requests in a meaningful way. When a user submits a request via the user interface 116, the system 100 deciphers the request using the Rasa NLU server 104, triggers the appropriate API call using the webhook configuration 110, identifies the relevant domain-specific functions based on conditional statements, and subsequently executes the tangible domain-specific operation. This leads to a more dynamic and context-aware response mechanism, enhancing user experience and system efficiency. Furthermore, the system 100 enables the integration of existing or legacy servers, which might have been designed before modern natural language processing (NLP) tools like Rasa became available, into the Rasa NLU framework. This not only extends the life and relevance of these legacy servers but also allows organizations to leverage the capabilities of modern NLP and AI-based chatbot services without having to entirely redevelop or replace their existing infrastructure. As a result, there's a seamless melding of old and new technologies, allowing users to access domain-specific functionalities via natural language requests. These technical effects highlight the ability of the system 100 to bridge the gap between older, domain-specific functionalities and modern natural language understanding frameworks, enabling automated, intuitive interactions for end-users.

Figure 2:
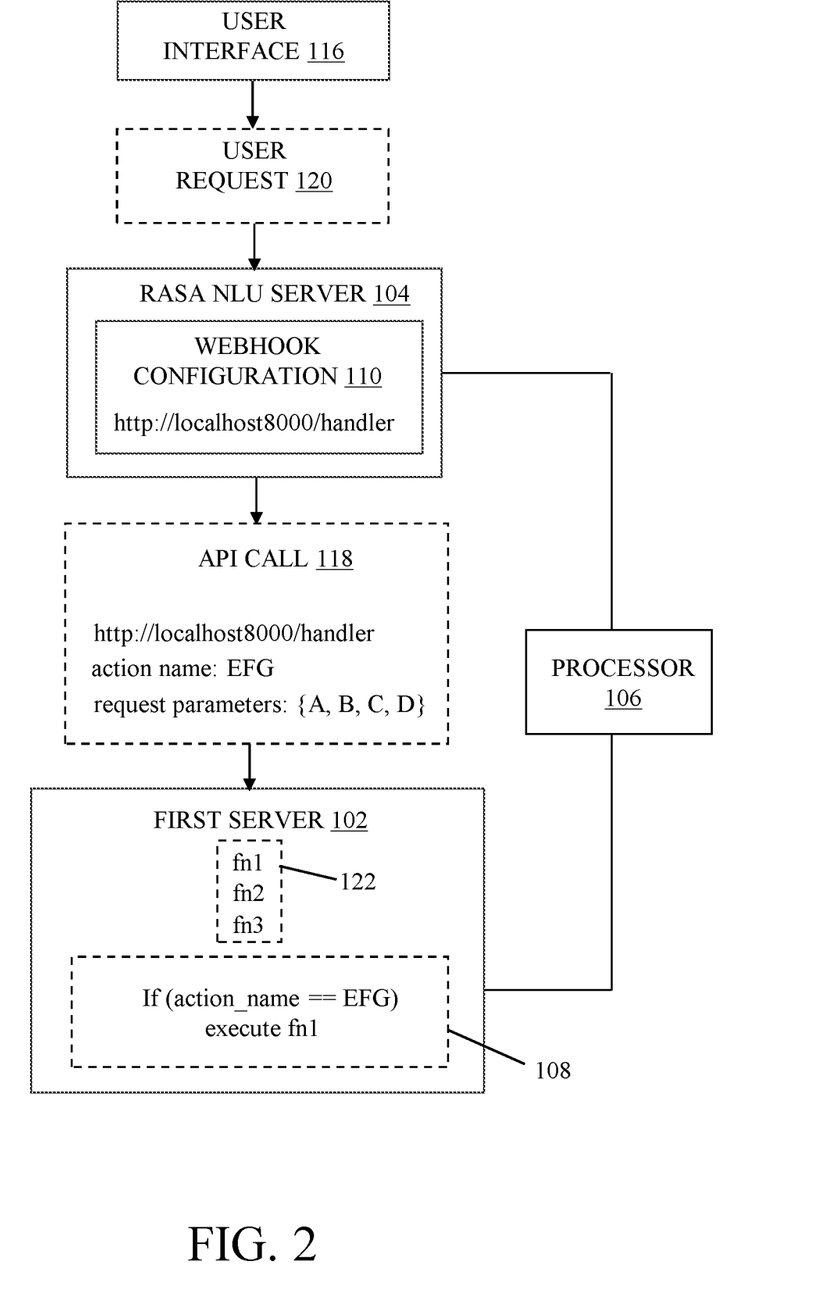
FIG. 2 is a diagram illustrating an exemplary scenario of operation of a system for adapting legacy servers to operate within a Rasa NLU framework, in accordance with an embodiment of the present disclosure.

FIG. 2 is a diagram illustrating an exemplary scenario of operation of a system for adapting legacy servers to operate within a Rasa NLU framework, in accordance with an embodiment of the present disclosure. With reference to FIG. 2, there is shown diagram illustrating an exemplary scenario of operation of the system 100 for adapting legacy servers to operate within the Rasa NLU framework.

In such exemplary scenario, the first server 102 may include a plurality of domain-specific functions 122 as fn1, fn2 and fn3. Further, the user may provide a user request 120 through the user interface 116 to the Rasa NLU server 104. The Rasa NLU server 104 is configured to identify user intent based on the user request 120. The Rasa NLU server 104 may include the webhook configuration 110 in the form of "http://localhost8000/handler", which establishes communication with the first server 102. Further, the processor 106 is configured to extract request parameters based on the user request 120. The request body may include action name as EFG and one or more request parameters as {A, B, C, D}. Further, the processor 106 is configured to generate an API call 118 using the webhook configuration 110 as http://localhost8000/handler, action name as EFG and the request parameters {A, B, C, D}. Further, the processor 106 is configured to transmit the API call 118 to the first server 102. Moreover, the processor 106 is configured to identify the conditional statements related to the action name EFG. Further, the processor 106 may be configured to execute the domain-specific function fn1 within the identified conditional statement in the API handler 108 as "if action name is EFG, then execute fn1". After execution of the domain-specific function fn1, the first server 102 is configured to perform tangible domain-specific operations associated with the domain-specific function "fn1" in response to the user request 120.

Figure 3:
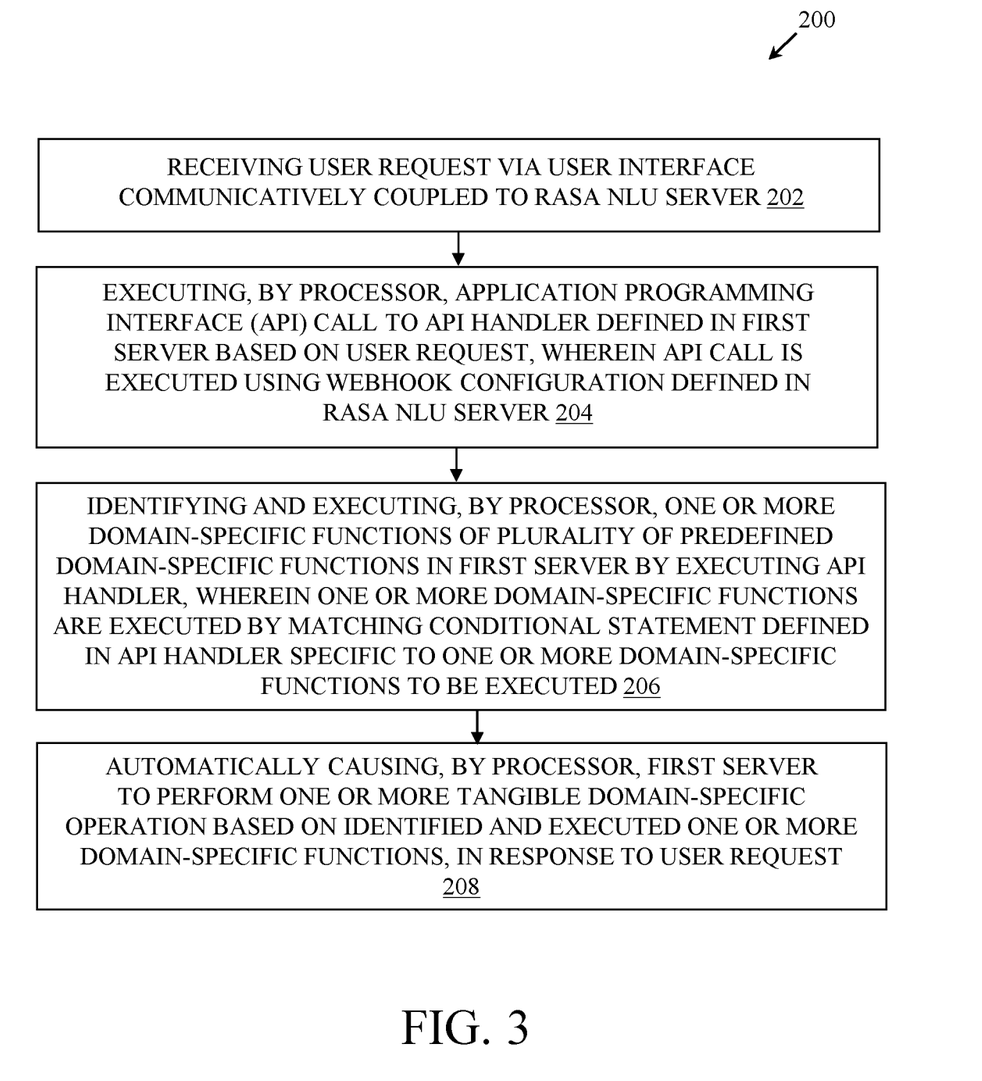
FIG. 3 is a flowchart illustrating a method for adapting legacy servers to operate within a Rasa NLU framework, in accordance with an embodiment of the present disclosure.

FIG. 3 is a flowchart of a method for adapting legacy servers to operate within a Rasa NLU framework. With reference to FIG. 3, there is shown a flowchart of a method 200 for adapting legacy servers to operate within the Rasa NLU framework. The method 200 comprises steps from 202 to 208.

At step 202, the method 200 includes receiving a user request via a user interface 116 communicatively coupled to the Rasa NLU server 104. In an implementation, the user request is received through the user interface 116 associated with the client device 114. The user request is received as a text input or a voice command.

At step 204, the method 200 includes executing, by the processor 106, an application programming interface (API) call to an API handler 108 defined in a first server 102 based on the user request. Moreover, the API call is executed using the webhook configuration 110 defined in the Rasa NLU server 104. The first server 102 refers to a hardware computing system, which is configured to manage and perform operations involved in an industry. The first server 102 configured to store a plurality of predefined domain-specific functions and each function is configured to perform one or more tangible domain-specific operations. The API call refers to a request or a message transmitted by the processor 106 to the first server 102 to execute one or more domain-specific functions of the plurality of predefined domain-specific functions. The webhook configuration 110 is specifically defined within the Rasa NLU server 104 to establish a real-time communication between the Rasa NLU server 104 and the first server 102.

In accordance with an embodiment, the webhook configuration 110 is a uniform resource locator, URL. Moreover, the URL is indicative of a path for transmitting the API call to the API handler 108 for executing the one or more domain-specific functions. In accordance with an embodiment, in order to execute the API call to the API handler 108, the Rasa NLU server 104 is configured to identify user intent from the user request and the processor 106 is configured to transmit the action name corresponding to the user intent from the Rasa NLU server 104 to the API handler 108 for executing the one or more domain-specific functions.

At step 206, the method 200 includes identifying and executing, by the processor 106, one or more domain-specific functions of the plurality of predefined domain-specific functions in the first server 102 by executing the API handler 108. Moreover, the one or more domain-specific functions are executed by matching a conditional statement defined in the API handler 108 specific to the one or more domain-specific functions to be executed. The API handler 108 is a body of conditional statements defined in the first server 102. In an implementation, the conditional statement for each action name is predefined in the API handler 108 of the first server 102 and the processor 106 is configured to match the conditional statement based on the action name received in the API call and execute the one or more domain-specific functions corresponding to the action name.

At step 208, the method 200 includes automatically causing, by the processor 106, the first server 102 to perform one or more tangible domain-specific operations based on the identified and executed one or more domain-specific functions, in response to the user request. The one or more tangible domain-specific operations include a set of operations to be executed in response to the user request. In an implementation, the one or more tangible functions are included in the body of conditional statements in the API handler 108. By executing the one or more tangible functions, the processor 106 is configured to perform operations required to satisfy the user request.

In accordance with an embodiment, the user request is received via the user interface 116 coupled to the Rasa NLU server 104 in a human language through a voice command or text command and the processor 106 is further configured to provide response related to the executed one or more domain-specific functions to the Rasa NLU server 104 which further returns response in the human language to the user interface 116 through a voice or text response. For example, the user request is a text input through the user interface 116 as "I want to open bank account". Based on the user request, the processor 106 is configured to execute the conditional statement associated with the one or more domain-specific functions related to opening bank account in the first server 102. After executing the conditional statement, the processor 106 is configured to return a response to the Rasa NLU server 104 which further returns a response as "account is successfully created" to the user.

In accordance with an embodiment, the conditional statement is a switch-case statement or an if-else statements indicative of the existing one or more predefined functions in the first server 102. By allowing different types of conditional statements (switch-case, if-else, or design patterns), the method 200 can accommodate various coding styles and preferences while adapting with the first server 102 as well as allows developers with different coding backgrounds and expertise can work on the method 200 without need of external libraries like the Rasa SDK.

The processor 106 in the method 200 seamlessly adapt the first server 102 (i.e., the legacy server) to operate with the Rasa NLU server 104 by conditionally triggering the domain-specific functions in the first server 102 through the API handler 108, while still avoiding use of the external libraries like the Rasa SDK while adapting the existing legacy server to work and operate with the Rasa NLU server 104. The processor 106 in the method 200 employs conditional statements within the API handler 108 to execute the appropriate domain-specific function based on the user's request. This eliminates the need for server-developers to perform extensive modifications in the existing codebase of the first server 102. The API handler 108 created in the method 200 enables the Rasa NLU server 104 to access the domain-specific functions in the first server 102 as an API call using the webhook configuration 110, which causes smooth integration of the first server 102 and the Rasa NLU server 104 without the need for complex custom coding or dependencies.

Modifications to embodiments of the present disclosure described in the foregoing are possible without departing from the scope of the present disclosure as defined by the accompanying claims. Expressions such as "including", "comprising", "incorporating", "have", "is" used to describe, and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A system for adapting legacy servers to operate within a Rasa natural language understanding, NLU, framework, the system comprising:
   a first server configured to store a plurality of predefined domain-specific functions, each function is configured to perform one or more tangible domain-specific operations;
   a Rasa natural language understanding, NLU, server configured to receive a user request via a user interface;
   a processor communicatively coupled to the first server and the Rasa NLU server, the processor is configured to:
   execute an application programming interface (API) call to an API handler defined in the first server based on the user request, wherein the API call is executed using a webhook configuration defined in the Rasa NLU server;
   identify and execute one or more domain-specific functions of the plurality of predefined domain-specific functions in the first server by executing the API handler, wherein the one or more domain-specific functions are executed by matching a conditional statement defined in the API handler specific to the one or more domain-specific functions to be executed;
   automatically cause the first server to perform one or more tangible domain-specific operations based on the identified and executed one or more domain-specific functions, in response to the user request.

2. The system according to claim 1, wherein the Rasa NLU server is configured to identify user intent from the user request and the processor is configured to transmit information regarding the user intent from the Rasa NLU server to the API handler for executing the one or more domain-specific functions.

3. The system according to claim 1, wherein the webhook configuration is a uniform resource locator, URL, the URL is indicative of a path for transmitting the API call to the API handler for executing the one or more domain-specific functions.

4. The system according to claim 1, wherein the user request is received via the user interface communicatively coupled to the Rasa NLU server in a human language through a voice command or text command and the Rasa NLU server is configured to provide response related to the executed one or more domain-specific functions by the processor in the human language through the user interface as a voice or text response.

5. The system according to claim 1, wherein the conditional statement is a switch-case statement or an if-else statements indicative of an existing one or more predefined functions in the first server.

6. A method for adapting legacy servers to operate within a Rasa natural language understanding, NLU, framework, the method comprises:
   receiving a user request via a user interface coupled to a Rasa natural language understanding, NLU, server;
   executing, by a processor, an application programming interface (API) call to an API handler defined in a first server based on the user request, wherein the API call is executed using a webhook configuration defined in the Rasa NLU server;
   identifying and executing, by the processor, one or more domain-specific functions of a plurality of predefined domain-specific functions in the first server by executing the API handler, wherein the one or more domain-specific functions are executed by matching a conditional statement defined in the API handler specific to the one or more domain-specific functions to be executed;

automatically causing, by the processor, the first server to perform one or more tangible domain-specific operations based on the identified and executed one or more domain-specific functions, in response to the user request.

7. The method according to claim 6, wherein in order to execute the API call to the API handler, the RASA NLU server is configured to identify user intent from the user request and the processor is configured to transmit information related to the user intent from the Rasa NLU server to the API handler for executing the one or more domain-specific functions.

8. The method according to claim 6, wherein the webhook configuration is a uniform resource locator, URL, the URL is indicative of a path for transmitting the API call to the API handler for executing the one or more domain-specific functions.

9. The method according to claim 6, wherein the user request is received via the user interface communicatively coupled to the Rasa NLU server in a human language through a voice command or text command and the Rasa NLU server is further configured to provide response related to the executed one or more domain-specific functions by the processor in the human language to the user interface through a voice or text response.

10. The method according to claim 6, wherein the conditional statement is a switch-case statement or if-else statements indicative of an existing one or more predefined functions in the first server.

* * * * *